UNITED STATES PATENT OFFICE.

RUDOLF KNIETSCH AND HENRY STALAY ARTHUR HOLT, OF LUDWIGS-HAFEN, GERMANY, ASSIGNORS TO THE BADISCHE ANILIN AND SODA FABRIK, OF SAME PLACE.

PROCESS OF MAKING INDIGO PRODUCTS.

SPECIFICATION forming part of Letters Patent No. 644,326, dated February 27, 1900.

Application filed October 18, 1898. Serial No. 693,942. (No specimens.)

*To all whom it may concern:*

Be it known that we, RUDOLF KNIETSCH, a subject of the King of Prussia, Emperor of Germany, and HENRY STALAY ARTHUR HOLT, a subject of the Queen of Great Britain and Ireland, both doctors of philosophy, residing at Ludwigshafen-on-the-Rhine, in the Kingdom of Bavaria and Empire of Germany, have invented new and useful Improvements in the Manufacture of Indigo Products, of which the following is a specification.

Our invention consists in a new process for the production of new "indigo products," including in this term blue coloring-matters belonging to the indigo group and leuco compounds thereof, from new condensation products which we have invented and which we obtain from the glycocoll-carboxy-esters of the aromatic series.

It is well known that the simple phenyl-glycocoll compounds on heating are readily converted into anhydrides, which are regarded chemically as keto-piperazides, but the production of corresponding compounds from glycocoll-carboxy-acids has not been successfully accomplished. We have discovered a method of preparing piperazine derivatives from the glycocoll-carboxy-acids, which can be derived from amido-malonic acid.

The first stage of our new process consists in the production of these new piperazine derivatives, and we proceed by heating the glycocoll-carboxy-ester in an indifferent solvent, or even without the use of a solvent, to a temperature of over 200° centigrade. The reaction product is purified in a suitable way—namely, by extracting with an organic solvent, such as alcohol or acetone, in which the desired product is only slightly soluble.

The new piperazine bodies are insoluble in dilute hydrochloric acid and dilute caustic soda, very slightly soluble in chloroform and methyl alcohol, readily soluble in boiling nitro-benzene or aniline. Their solution in concentrated sulfuric acid is intensely fluorescent and possesses a characteristic absorption spectrum.

The second stage of our new process consists in heating a piperazine derivative obtained, as above indicated, with fixed caustic alkali—namely, caustic soda or caustic potash, to which some caustic lime may be added. A yellow to red melt is obtained, which contains indigo leuco bodies, which can either be precipitated by acids and collected as such or can be converted into a blue coloring-matter of the indigo group by dissolving the melt in water and oxidizing with air or any other suitable oxidizing agent.

The following examples will serve to illustrate the manner in which our new process can be carried into practical effect. The parts are by weight.

*Example 1: Production of a new piperazine derivative from para-tolyl-glycocoll-carboxy-di-ethyl-ester.*—Dissolve one (1) part of para-tolyl-glycocoll-carboxy-di-ethyl-ester in one and a half (1½) parts of petroleum, boiling at a high temperature, and heat to about 250° centigrade until the mass is converted into a paste of crystals. Allow to cool, filter with the aid of a filter-pump, wash the residue with ligroine, and then extract with glacial acetic acid and allow to cool. The reaction product is of a light yellow color and is then pure enough for all practical purposes.

*Example 2: Production of a piperazine derivative from beta-naphthyl-glycocoll-carboxy-di-ethyl-ester.*—Mix together one (1) part of beta-naphthyl-glycocoll-carboxy-di-ethyl-ester and two (2) parts of alpha-chlor-naphthalene and heat the mixture to a temperature of about 260° centigrade, until the melt turns to a mass of crystals. This usually takes about one hour. Allow to cool, collect the crystals by filtration, wash with ligroine, and extract with glacial acetic acid.

The foregoing two examples illustrate the manner in which the first stage of the process can be carried out, using the various aromatic-glycocoll-carboxy-di-alkyl-esters. If desired, a solvent need not be used in the manner given in the above examples. In that case the melt obtained after heating for some time at the high temperature solidifies. It is powdered, and in order to obtain the desired piperazine compound pure it is extracted with a solvent—such as boiling alcohol, acetone, benzene, or glacial acetic acid. The extracted mass is allowed to cool, freed from solvent by filtration, and dried.

*Example 3: Production of the indigo products from the piperazine derivative.*—Mix together one (1) part of the tolyl-piperazine derivative obtained as described in Example 1 and four (4) parts of caustic potash and heat the mixture at a temperature of about 250° to 280° centigrade, excluding the air as far as possible. Maintain the temperature until the melt has assumed a deep orange-red color and it can be seen by testing that the highest yield of coloring-matter is being obtained. Allow the melt to cool, powder it up, and if it be desired to obtain the indigo product in the form of leuco compound add to it six (6) parts of ice-cold dilute sulfuric acid, (containing about twenty-five per cent. real acid $H_2SO_4$.) Filter the product which separates out. If, on the other hand, it be desired to obtain the blue indigo coloring-matter itself direct, dissolve the melt in water and precipitate the coloring-matter in the usual way—for instance, by oxidizing with air.

The foregoing Example 3 illustrates the manner in which the second stage of our process is effected. Other piperazine derivatives obtained according to the first stage can be treated in a similar manner.

What we claim is—

1. The process for the production of indigo products from an aromatic glycocoll-carboxy-di-alkyl-ester by heating same to a temperature of above 200° centigrade, and so converting it into a piperazine derivative, then melting this piperazine derivative with a fixed caustic alkali, all substantially as described.

2. The process for the production of indigo products from an aromatic glycocoll-carboxy-di-alkyl-ester by heating same to a temperature of above 200° centigrade, and so converting it into a piperazine derivative, then melting this piperazine derivative with a fixed caustic alkali and lime, all substantially as described.

3. In a process for the production of indigo products from an aromatic glycocoll-carboxy-di-alkyl-ester, heating the same to a temperature of above 200° centigrade and so converting it into a piperazine derivative.

4. In a process for the production of indigo products melting a piperazine derivative of an aromatic glycocoll-carboxy-dialkyl-ester with a fixed caustic alkali, all substantially as described.

In testimony whereof we have hereunto set our hands in the presence of two subscribing witnesses.

RUDOLF KNIETSCH.
HENRY STALAY ARTHUR HOLT.

Witnesses:
ERNEST F. EHRHARDT,
J. L. HEINKE.